J. R. WILLIAMS.
CATCH BASIN AND TRAP.
APPLICATION FILED MAY 25, 1908.

901,859.

Patented Oct. 20, 1908.

Witnesses
C. E. Hunt
C. H. Griesbauer

Inventor
John R. Williams

By H. R. Williams & Co.
Attorneys

UNITED STATES PATENT OFFICE.

JOHN R. WILLIAMS, OF MILWAUKEE, WISCONSIN.

CATCH-BASIN AND TRAP.

No. 901,859.

Specification of Letters Patent.

Patented Oct. 20, 1908.

Application filed May 25, 1908. Serial No. 434,883.

*To all whom it may concern:*

Be it known that I, JOHN R. WILLIAMS, a citizen of the United States, residing at Milwaukee, in the county of Milwaukee and State of Wisconsin, have invented certain new and useful Improvements in Catch-Basins and Traps; and I do declare the following to be a full, clear, and exact description of the invention, such as will enable others skilled in the art to which it appertains to make and use the same.

This invention relates to improvements in catch basins and traps for cellar drainage and has for its object the production of a simple and efficiently operating device of this kind which may be installed in position with great facility.

A further object of the invention is to so construct the device that dirt or sediment will be kept out of the trap thus obviating the necessity of frequently removing the trap and the attendant objectionable features resulting therefrom.

A further object of the invention is to so construct the device that in the event of dirt or sediment eventually collecting at the bottom of the trap, the same may be removed in an expeditious manner and with but slight inconvenience.

With these and other objects in view, the invention consists of certain novel features of construction, combination and arrangement of parts, as will be more fully described and particularly pointed out in the appended claims.

Figure 1:
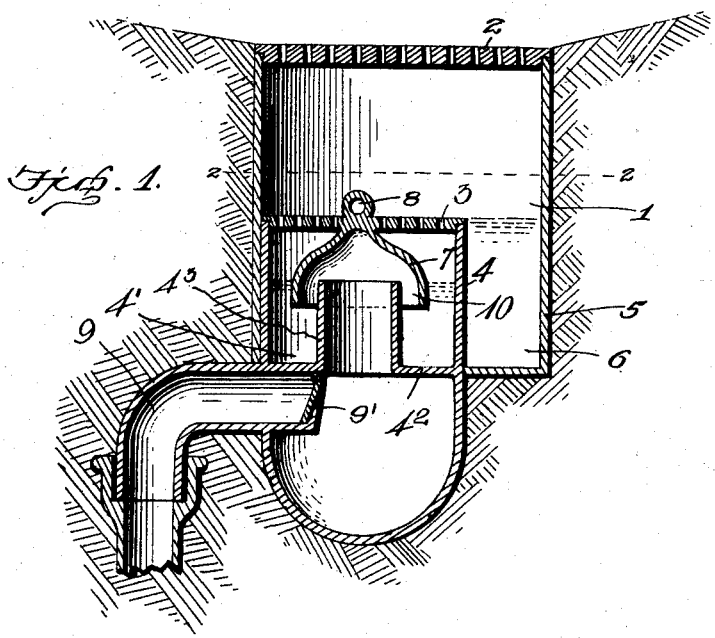
Figure 2:
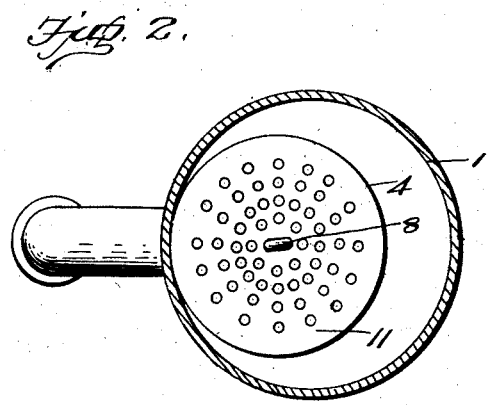

In the accompanying drawings, Figure 1 represents a central vertical section of the device as applied in position, Fig. 2 is a horizontal section taken on line 2—2 of Fig. 1.

As shown in the drawings, this device embodies an upright body or casing 1 provided with a removable perforated cover 2.

The numeral 4 indicates the trap, the upper end of which projects a suitable distance within the casing and is provided with an annular sediment chamber 4' formed by a transverse partition 4² provided with a central tubular extension 4³. This trap is of somewhat less diameter than the casing and is arranged at one side thereof or eccentric therewith, a portion of the wall of the upper end of the trap coöperating with a portion of the wall of the casing to provide a crescent-shaped sediment chamber 6 (see Fig. 1). A bell-shaped deflector 7 is arranged in the sediment chamber 4', said deflector having a handle 8 which extends through and above a perforated cover 3 closing in the upper end of the trap. The waste pipe 9 extends into the trap below the partition 4² thereof, the inner projecting end of the waste pipe having an outwardly opening flap valve 9' which permits the discharge of the water through the waste pipe but prevents back flow of the water or gases into the trap. The lower end of the trap, as shown, extends a suitable distance below the waste pipe and is adapted to receive any sediment that may eventually overflow the chamber 4.

In practice, the waste water passes through the perforated cover 2 of the casing and thence through the cover 3 of the trap through the passage 10 between the upper end of the tubular extension 4³ and the deflector 7 into said extension and then through the waste pipe 9, the greater portion of the sediment collecting in the chamber 6 of the casing and the remaining portion being deflected by the deflector 7 into the chamber 4'. In this manner the sediment is kept out of the waste pipe and liability of the same becoming "chocked" up is obviated. In the event of the sediment eventually filling the chambers 4' and 6 respectively, it will collect at the bottom of the trap from which it may be removed by removing the covers 2 and 3.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim as new is:—

1. A device of the character described comprising an upright casing, a trap arranged eccentrically within and projecting below the casing, a transverse partition provided with a central upright tubular extension formed in the trap, a waste pipe extending into the trap below said partition and an outwardly opening check valve arranged in the waste pipe.

2. A device of the character described comprising a cylindrical casing, an upright cylindrical trap arranged eccentrically with and extending through the bottom of the casing, leaving a crescent-shaped space between a portion of the outer surface of the upper projecting end of the trap and a portion of the inner surface of the casing, a transverse partition provided with a central upright tubular extension formed in the trap, a bell-shaped deflector arranged in the upper end of the trap and surrounding the upper end of the tubular extension, a waste pipe extending into the trap below the partition thereof, and an outwardly opening check valve in the waste pipe.

3. A device of the class described comprising a casing, a removable perforated cover arranged over the upper end thereof, a trap extending through the bottom of the casing, a partition provided with a central tubular extension formed in the trap, a removable perforated cover arranged over the upper end of the trap, a bell-shaped deflector arranged in the upper end of the trap and surrounding the upper end of the tubular extension, said deflector having a handle portion projecting through and above the trap cover, a waste pipe extending into the trap below the casing and a check valve arranged in the waste pipe.

In testimony whereof I have hereunto set my hand in presence of two subscribing witnesses.

JOHN R. WILLIAMS.

Witnesses:
   CHRISTAIN S. OTJEN,
   HERMAN F. BECK.